United States Patent
Kim et al.

(10) Patent No.: US 9,468,029 B2
(45) Date of Patent: *Oct. 11, 2016

(54) UNIFYING MULTIPLE WIRELESS NETWORKS

(71) Applicant: Belkin International, Inc., Playa Vista, CA (US)

(72) Inventors: Ryan Yong Kim, Rolling Hills Estates, CA (US); Venkata Subba Rao Pathuri, Alpharetta, GA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/203,522

(22) Filed: Mar. 10, 2014

(65) Prior Publication Data
US 2015/0257083 A1    Sep. 10, 2015

(51) Int. Cl.
| | |
|---|---|
| H04W 76/02 | (2009.01) |
| H04L 29/06 | (2006.01) |
| H04L 12/24 | (2006.01) |
| H04W 88/16 | (2009.01) |
| H04W 84/12 | (2009.01) |
| H04L 29/12 | (2006.01) |
| H04W 12/04 | (2009.01) |
| H04W 12/06 | (2009.01) |

(52) U.S. Cl.
CPC ........ H04W 76/021 (2013.01); H04L 41/0803 (2013.01); H04L 63/00 (2013.01); *H04L 61/20* (2013.01); *H04W 12/04* (2013.01); *H04W 12/06* (2013.01); *H04W 84/12* (2013.01); *H04W 88/16* (2013.01); *Y02B 60/50* (2013.01)

(58) Field of Classification Search
CPC .. H04W 88/16; H04W 76/021; H04L 9/0866
USPC .................................................. 370/328, 338
See application file for complete search history.

(56) References Cited

U.S. PATENT DOCUMENTS

| | | | | |
|---|---|---|---|---|
| 2002/0111698 | A1* | 8/2002 | Graziano et al. | 700/17 |
| 2008/0151916 | A1* | 6/2008 | Jetcheva et al. | 370/401 |
| 2009/0285190 | A1* | 11/2009 | Baron et al. | 370/338 |
| 2012/0322407 | A1* | 12/2012 | Haberman | 455/411 |
| 2014/0247941 | A1* | 9/2014 | Gu | H04L 63/062 380/270 |
| 2015/0257179 | A1 | 9/2015 | Kim et al. | |

OTHER PUBLICATIONS

Final Office Action of Dec. 17, 2014 for U.S. Appl. No. 14/289,244, 13 pages.
Non-Final Office Action of Aug. 4, 2014 for U.S. Appl. No. 14/289,244, 21 pages.
Non-Final Office Action of Sep. 30, 2015, for U.S. Appl. No. 14/289,244, 17 pages.

* cited by examiner

*Primary Examiner* — Andrew Chriss
*Assistant Examiner* — Romani Ohri
(74) *Attorney, Agent, or Firm* — Kilpatrick Townsend & Stockton LLP

(57) ABSTRACT

Techniques for unifying multiple logical networks are provided. For example, a method may include receiving, at a computing device, a communication, wherein the communication includes an indication that a first network identifier and a second network identifier are associated with a plurality of network devices in a network. The method may further include determining a common network identifier for use with the plurality of network devices in the network and transmitting the common network identifier to one or more of the plurality of network devices.

20 Claims, 9 Drawing Sheets

UNIFYING MULTIPLE WIRELESS NETWORKS

FIELD

The present disclosure relates to unifying multiple wireless networks. Specifically, various techniques and systems are provided for unifying multiple wireless networks under a common network profile.

BACKGROUND

Multiple gateways may be present within a local area network. For example, a user's home local area network may include a router and a range extender. Network devices that provide various functionalities may also be present within the local area network. For example, a home automation network device may provide a user with the ability to remotely configure or control one or more appliances within the user's home. Each network device within the local area network may be given a network profile based on the gateway with which each network device is connected. Each network profile is associated with a different logical network (e.g., having a unique network identifier). Accordingly, multiple logical networks having different network identifiers may be associated with the network devices due to the existence of multiple gateways. A user may only be able to connect to one logical network at a time, and thus the existence of multiple logical networks may prevent a user from accessing all of the network devices within the local area network.

BRIEF SUMMARY

Techniques are described for unifying multiple wireless networks under a common network profile. In some examples, a server may determine that multiple logical networks exist within a home local area network. The server may unify the logical networks into a common logical network with a common network profile. For example, a home local area network may include a first gateway connected with a first network device, and a second gateway connected with a second network device. The first gateway may be registered as a first logical network and may be associated with a first network identifier (ID) and one or more security keys. The second gateway may be registered as a second logical network with a second network ID and one or more security keys. The server may determine that multiple network IDs are associated with the home local area network, and thus that multiple logical networks exist. For example, the server may determine the existence of multiple network IDs based on communications from the network devices and/or communication from a mobile device that is associated with the network devices. Upon determining that multiple logical networks exist within the same home local area network, the server may determine a common network ID. The server may then register the first gateway and the second gateway as a single logical network using the common network ID. Accordingly, the common network ID may be associated with both the first network device and the second network device regardless of the gateway with which the network devices are connected.

According to at least one example, a computer-implemented method may be provided that includes receiving, at a computing device, a communication, wherein the communication includes an indication that a first network identifier and a second network identifier are associated with a plurality of network devices in a network. The method may further include determining a common network identifier for use with the plurality of network devices in the network and transmitting the common network identifier to one or more of the plurality of network devices.

In some embodiments, a computing device may be provided that includes one or more data processors. The computing device may further include a non-transitory computer-readable storage medium containing instructions which when executed on the one or more data processors, cause the one or more processors to perform operations including: receiving a communication, wherein the communication includes an indication that a first network identifier and a second network identifier are associated with a plurality of network devices in a network; determining a common network identifier for use with the plurality of network devices in the network; and transmitting the common network identifier to one or more of the plurality of network devices.

In some embodiments, a computer-program product tangibly embodied in a non-transitory machine-readable storage medium of a first network device may be provided. The computer-program product may include instructions configured to cause one or more data processors to: receive a communication, wherein the communication includes an indication that a first network identifier and a second network identifier are associated with a plurality of network devices in a network; determine a common network identifier for use with the plurality of network devices in the network; and transmit the common network identifier to one or more of the plurality of network devices.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
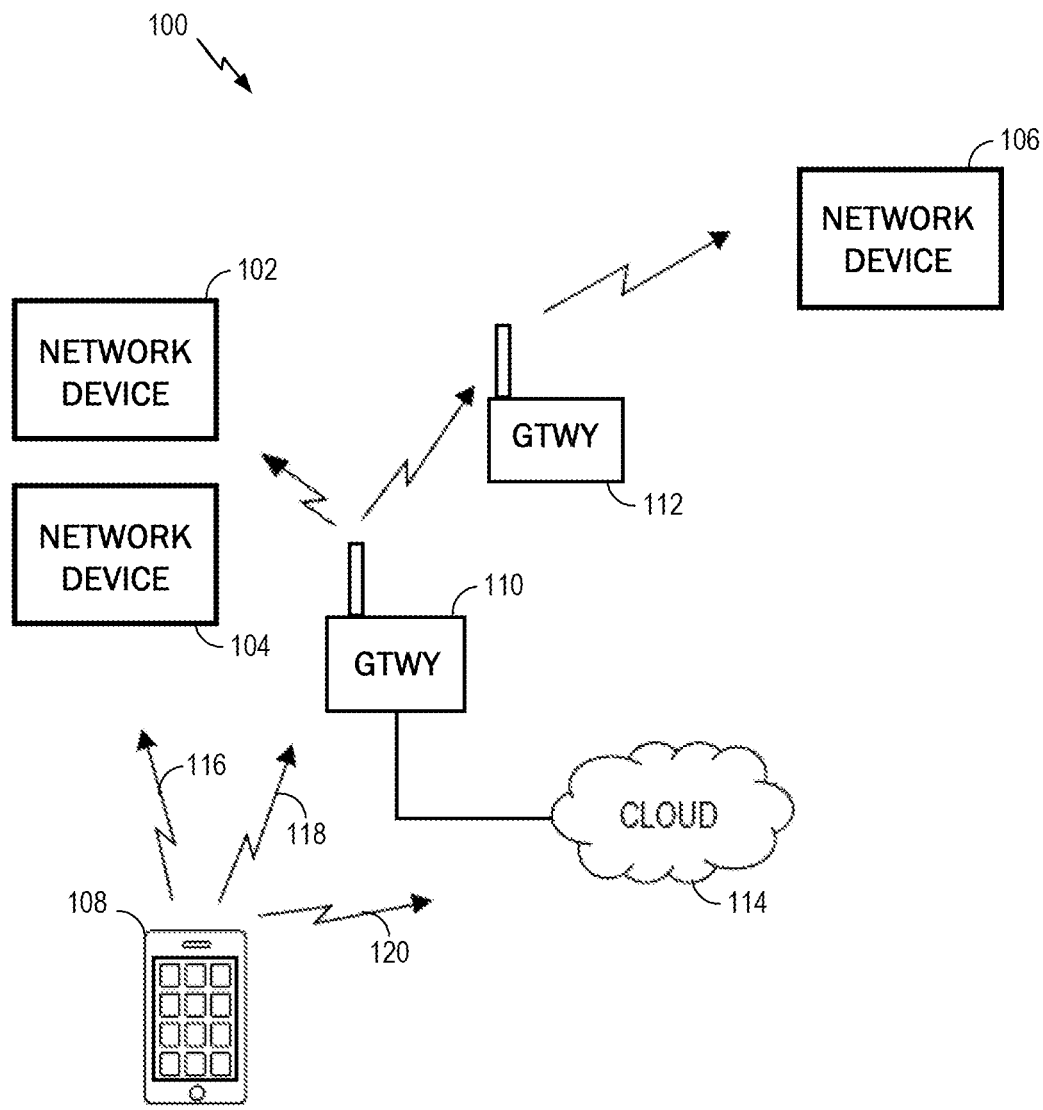
FIG. 1 is an illustration of an example of a wireless network environment in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, wireless channels, and various other mediums capable of storing, containing or carrying instruction(s) and/or data. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A local area network may be set up to provide a user with access to various devices within the network. For example, a home automation network may include one or more network devices that provide a user with the ability to remotely configure or control one or more appliances within the user's home. The local area network may include one or more gateways that provide the user with access to the network devices. The one or more gateways may also provide the user and the network devices with access to one or more external networks, such as a cloud network, the Internet, and/or other wide area networks.

It is desirable for a user to be able to access the network devices (e.g., using a mobile device) while located within the local area network and also while located remotely from the local area network. As explained herein, a local area network may include multiple logical networks. In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, the mobile device may be authenticated based on the mobile device's authentication with the logical network. For example, if the mobile device has authorized access to the logical network (e.g., a WiFi network provided by a gateway), the network devices paired with that logical network may allow the mobile device to connect to them without requiring a login. Accordingly, only users of mobile devices that have authorization to access the logical network are authorized to access network devices within the logical network, and these users are authorized without having to provide login credentials for the network devices.

While remote, the user may access the network devices using an external network, such as a cloud network and/or the Internet. An accountless authentication process may also be performed when the user is remote so that the user can access network devices within the logical network without having to enter network device login credentials. For example, a cloud network server may provide a network ID and/or one or more keys to a network device and to a mobile device (e.g., running an application, program, or the like). In some cases, a unique key may be generated for the network device and a separate unique key may be generated for the mobile device. The keys may be specifically encrypted with unique information identifiable only to the network device and the mobile device. The network device and the mobile device may be authenticated using the network ID and/or each device's corresponding key each time the network device or mobile device attempts to access the cloud network server.

In one example, a home wireless local area network may include a single gateway, such as a router. A network device within the local area network may pair with or connect to the gateway and may obtain credentials from the gateway. For example, when the network device is powered on, a list of gateways that are detected by the network device may be displayed on a mobile device (e.g., via an application, program, or the like installed on and executed by the mobile device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The mobile device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send information relating to the network device (e.g., MAC address, serial number, or the like) and/or information relating to the mobile device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the mobile device. The server may associate the network device and the mobile device with the logical network by storing the network ID and the set of security keys in a record or profile. The cloud network server may then transmit the network ID and the set of security keys to the network device. The network device may store the network ID and its unique security key. The network device may also send the network ID and the mobile device's unique security key to the mobile device. The network device and the mobile device may then communicate with the cloud server using the network ID and the unique key generated for each device. Accordingly, the user may remotely access the network device via the cloud network without logging in each time access is requested. Also, the network device can exchange communications with the server regarding the logical network.

In some embodiments, a local area network may include multiple gateways (e.g., a router and a range extender) and multiple network devices. For example, a local area network may include a first gateway paired with a first network device, and a second gateway paired with a second network device. A server (e.g., a cloud network server) may register the first gateway as a first logical network with a first network ID and may generate a first set of security keys for the first network device and a mobile device. The first set of security keys may include a unique security key for the first network device and a unique security key for the mobile device for use in accessing the first network device on the first logical network. The server may register the second gateway as a second logical network due to differences in the credentials between the first gateway and second gateway. The server may assign the second gateway a second network ID and may generate a second set of security keys. For example, the server may generate a unique security key for the second network device and may generate a unique security key for the mobile device for use in accessing the second network device on the second logical network. The server may associate the first network device and the mobile device with the first logical network by storing the first network ID and the first set of security keys in a first record or profile. The server may also associate the second network device and the mobile device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the mobile device's unique security key to the mobile device. The network devices and the mobile device may then communicate with the cloud server using the respective network ID and the unique key generated for each device.

Accordingly, when multiple gateways are included in the home local area network, multiple logical networks associated with different network identifiers may be present within the local area network. When the mobile device is located within range of both gateways in the local area network, there is no problem accessing both network devices due to the ability of the mobile device to perform local discovery techniques (e.g., universal plug and play (UPnP)). However, when the user is located remotely from the local area network, the mobile device may only be associated with one logical network at a time, which prevents the mobile device from accessing network devices of other logical networks within the local area network. Accordingly, techniques and systems are described herein for unifying multiple logical wireless networks under a common network record or profile with a common network ID.

FIG. 1 illustrates an example of a wireless local area network 100. The local area network 100 includes network device 102, network device 104, and network device 106. In some embodiments, the network devices 102, 104, 106 may include home automation network devices that allow a user to access, control, and/or configure various home appliances located within the user's home, such as a television, radio, light, microwave, iron, and/or the like. For example, network device 102 may include a home automation switch that may be coupled with a home appliance.

A user may wirelessly communicate with the network devices 102, 104, 106 using mobile device 108. The mobile device 108 may include a cellular telephone, a smartphone, a laptop computer, a tablet, a personal digital assistant (PDA), a computing device, wearable devices (e.g., a smart watch, or the like), or any other mobile device having wireless connection capability. While only a single mobile device 108 is shown in FIG. 1, one of ordinary skill in the art will appreciate that multiple mobile devices may connect with the network devices 102, 104, 106. The user may interact with the network devices 102, 104, or 106 using an application, a web browser, a proprietary program, or any other program executed and operated by the mobile device 108. In some embodiments, the mobile device 108 may communicate directly with the network devices 102, 104, 106 (e.g., communication signal 116). In some embodiments, the mobile device 108 may communicate with the network devices 102, 104, 106 via the gateways 110, 112 (e.g., communication signal 118) and/or the cloud network 114 (e.g., communication signal 120).

The local area network 100 further includes gateway 110 and gateway 112. Gateway 110 or 112 can be utilized for communicating with network devices 102, 104, 106 or mobile device 108 via radio signals in order to provide communication, location, and/or other services to the devices. While two gateways 110 and 112 are shown in FIG. 1, one of ordinary skill in the art will appreciate that any number of gateways may be present within the local area network 100. The wireless network provided by gateway 110 and gateway 112 may be any type of network familiar to those skilled in the art that can support data communications using any of a variety of commercially-available protocols. For example, gateways 110, 112 may provide wireless communication capabilities for the wireless local area network 100 using particular communications protocols, such as WiFi (e.g., IEEE 802.11 family standards, or other mobile communication technologies, or any combination thereof). Using the communications protocol(s), the gateways 110, 112 may transmit and receive radio frequencies with which wireless enabled devices in local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extender, and/or any other device that provides wireless network access among one or more computing devices and/or external networks. For example, gateway 110 may include a router and gateway 112 may include a range extender.

The gateways 110 and 112 may also provide the mobile device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application. In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106, and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the mobile device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
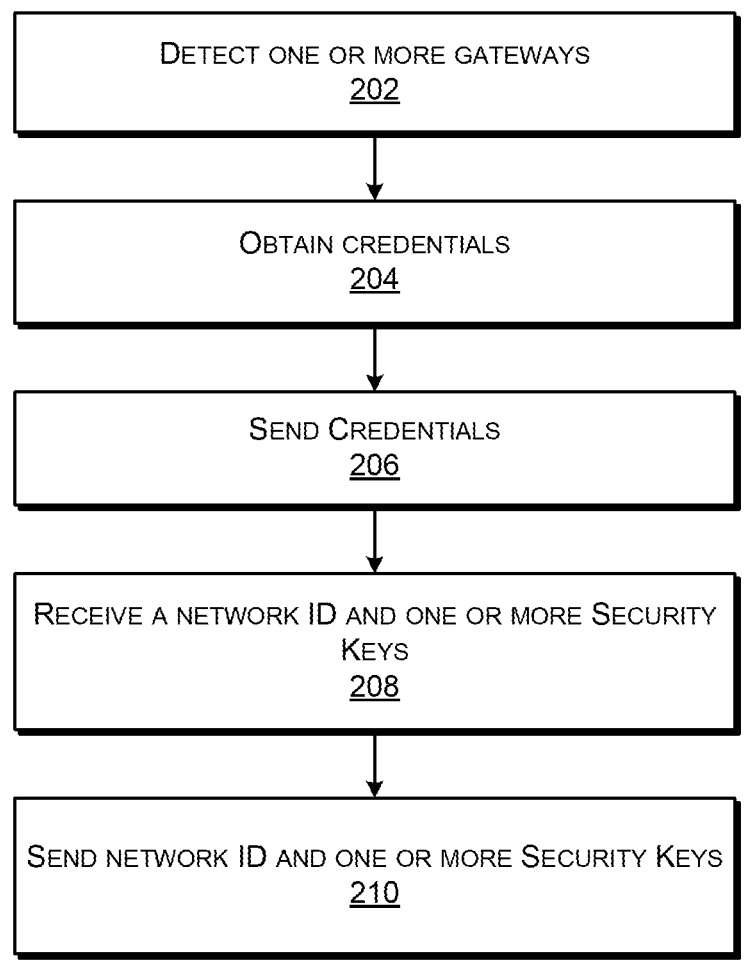
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset. During the provisioning process, the mobile device may directly communicate with the network device. In some embodiments, direct communication between network devices 102, 104, 106 and mobile device 108 may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and mobile device with a server, such as a server located within the cloud network 114. For example, upon being powered on or reset to factory settings, the network device may send or broadcast identification information to a mobile device. The identification information may be sent during a discovery process. For example, the identification information may be sent in response to a discovery request from the mobile device 108. In some cases, the identification information may include a name of the network device.

An application, program, or the like that is installed on and executed by the mobile device may receive the identification information from the network device. When the application on the mobile device is launched by a user, the mobile device may display the identification information for selection by the user. Once the network device identification information is selected, the network device may send to the mobile device a list of gateways that are detected by the network device. The mobile device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The mobile device may then prompt the user to enter login information that is required for accessing the network signals provided by the gateway. For example, the login information may be the same information that was originally set up to access the gateway network signals (e.g., when the gateway was initially installed). The mobile device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 214). For example, the mobile device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later points in time, network devices 104 and 106 may obtain credentials from gateways 110 and 112, respectively. In some embodiments, the credentials may include a SSID of the wireless local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which they are paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, or the like) and/or information relating to the mobile device (e.g., MAC address, serial number, application unique identifier, or the like) to the server. In some embodiments, the communication of the credentials from the network device to the cloud network server may be a Hypertext Transfer Protocol (HTTP), a Hypertext Transfer Protocol Secure (HTTPS) communication, a secure Transmission Control Protocol (TCP) communication, or the like. One of ordinary skill in the art will appreciate that other communication mechanisms may be used to communicate between the network device and the cloud network server.

Once the credentials are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the mobile device. For example, the server may generate a unique key for the network device 102 and a separate unique key for the mobile device 108.

In some embodiments, as previously described, network device 104 may also be paired with gateway 110 at the same or a later point in time as the network device 102. During registration of the network device 104, the server may determine that the mobile device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the mobile device 108 when registering the gateway 110 as the first logical network.

The gateway 112 may also be registered by the server as a second logical network with a second network ID. A second set of security keys may be generated for the network device 106 and the mobile device 108. For example, the server may generate a unique security key for the network device 106 and a unique security key for the mobile device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the mobile device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for a mobile device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the mobile device 108 when registering the first logical network. The network device 104 may then receive and store the first network ID and the security keys from the server.

At 210, the network device may send the network ID and the set of security keys to the mobile device. For example, the network device 102 may send to the mobile device 108 the first network ID and the unique security key generated for the mobile device 108. The network device 102 and the mobile device 108 may then communicate with the cloud network server using the first network ID and each device's unique key. In some embodiments, the network device and the mobile device may generate a signature using their respective security key. The signature is sent to the cloud network server along with a communication from the network device or mobile device. The cloud network server may then process the signature in order to authenticate each device, as described below. The network device and mobile device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

A mobile device may also generate a signature using its uniquely generated security key. For example, the mobile device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of mobile device that is used and the type of values that may be accessed and/or generated by the type of mobile device. In some cases, one type of mobile device may not allow an application to access a unique identifier of the mobile device (e.g., a serial number, UUID, or the like). In such cases, the SDU UniqueId value may include a value generated by an application or program installed on and executed on the mobile device that is used to access the network device. The value may be unique to the application or program that generated the value. In other cases, another type of mobile device may allow an application to access a unique identifier of the mobile device. In such cases, the SDU UniqueId value may include a value that is unique to the mobile device itself, such as a serial number, UUID, or the like. In this example, the mobile device may retrieve the unique value from storage within the mobile device. One of ordinary skill in the art will appreciate that other unique identifiers may be used to uniquely identify the mobile device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the mobile device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the mobile device's unique identifier. The ExpirationTime term may indicate the period of time for which the signature is valid, similar to that above for the signature generated by the network device.

The mobile device may place the signature in a data packet and may transmit the data packet to the cloud network server with a communication signal. The network device may also place the network ID in the data packet. The signature and the network ID, if included, may be used by the cloud network server to verify that the mobile device is associated with the logical network and authorized to communicate with one or more network devices associated with the logical network. In some embodiments, a signature is provided with each communication sent from the mobile device to the server. The cloud server may receive the signature and may generate a signature using the same expression as that used by the mobile device. For example, the server may retrieve the mobile device's key and other relevant information from storage and generate the signature using the key and the other information using the expression described above. The server then verifies whether the signatures match. Upon determining that the signatures match, the server authenticates the mobile device and allows it to communicate with one or more of the network devices associated with logical network.

Once the provisioning process is completed, the mobile device 108 may access the network device 102 locally via the gateway 110 (e.g., communication signal 118) or remotely via the cloud network 114 (e.g., communication signal 120). In some embodiments, the communication between the mobile device 108 and the cloud network 114 may be a HTTP or HTTPS communication. One of ordinary skill in the art will appreciate that other communication mechanisms may be used to communicate between the mobile device 108 and the cloud network 114.

As previously described, the mobile device, when located within range of the local area network, may be authenticated using accountless authentication that is based on the mobile device's authentication with the logical network. For example, if the mobile device has authorized access to the logical network (e.g., a WiFi network provided by a gateway), the network devices paired with that logical network may allow the mobile device to connect with them without requiring a network device login. Accordingly, the network device may perform accountless authentication of mobile devices that have authorization to access the logical network without requiring a user to provide login credentials for the network devices. While located remotely, the mobile device may also be authenticated to access the network devices via the cloud network using an accountless authentication process. For example, the network ID and the mobile device's unique security key may be used to allow the mobile device to communicate with the network devices via the cloud network (e.g., by generating a signature as described above).

When the mobile device 108 is located within range of both gateways 110, 112 in the local area network 100, the mobile device 108 does not encounter any issues when attempting to access any of the network devices 102, 104, 106. For example, the mobile device 108 may perform UPnP discovery and may list all if the network devices 102, 104, 106 that have responded to the discovery request regardless of which network ID the network devices 102, 104, 106 have. Accordingly, the existence of the first and second logical networks with first and second network IDs does not lead to any issues when the mobile device 108 is located within the local area network 100. However, when the user is located remotely, the mobile device 108 may only be associated with one logical network at a time. For example, the mobile device 108, while located remotely from the local area network 100, may query the cloud server with a known network ID (e.g., the first or second network ID). In response, the server will only return the network devices associated with that network ID. As a result, the user will not be able to see all network devices within the user's local area network 100.

Figure 3:
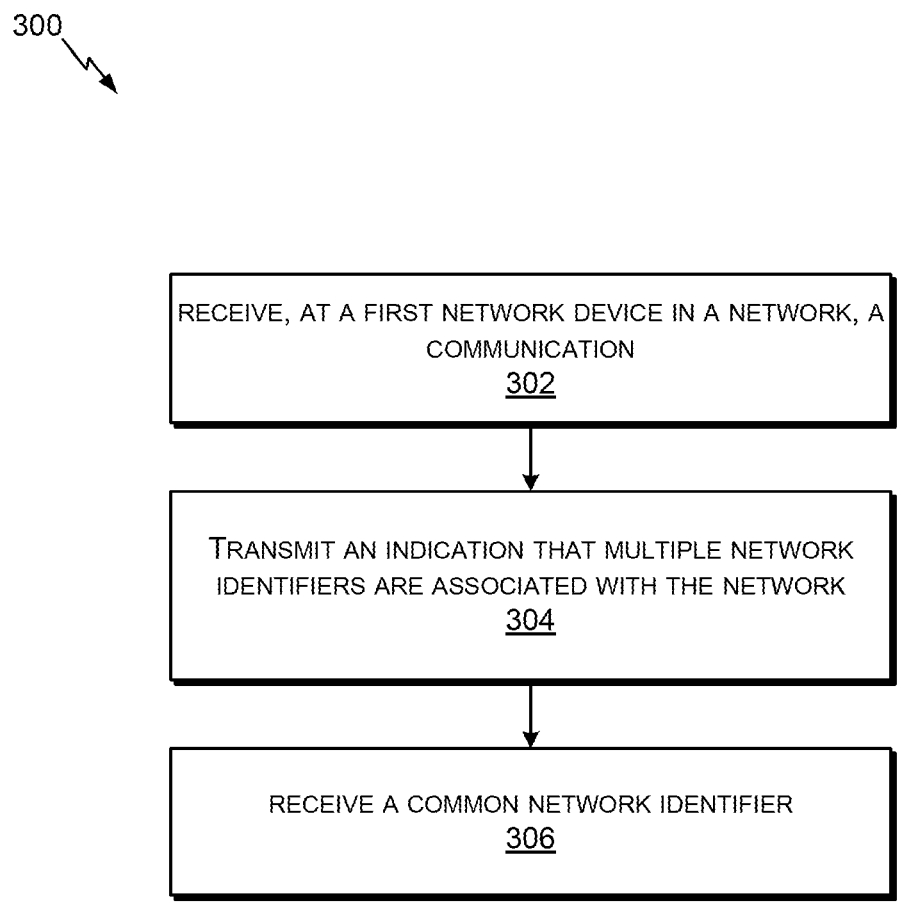
FIG. 3 is a flowchart illustrating an embodiment of a process for unifying multiple logical wireless networks, in accordance with some embodiments.
Figure 4:
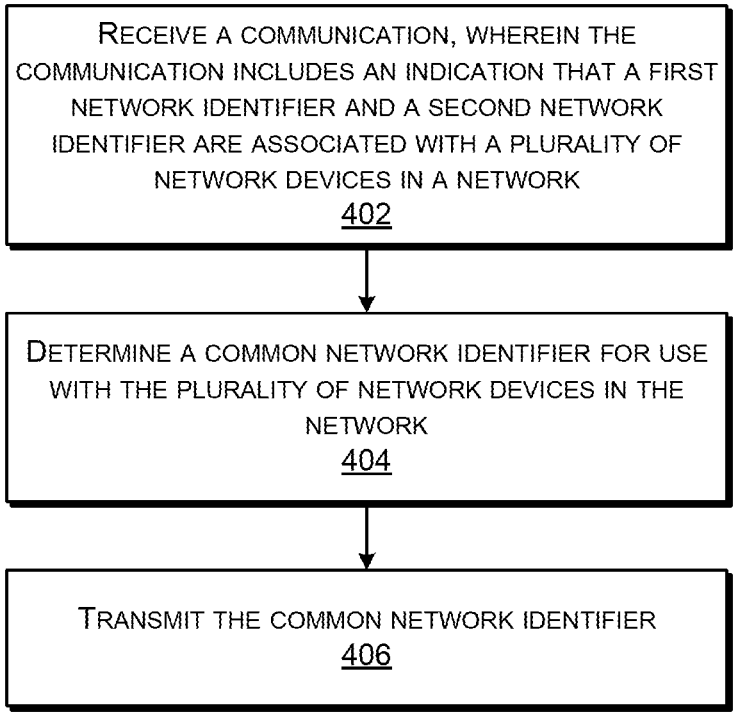
FIG. 4 is a flowchart illustrating an embodiment of another process for unifying multiple logical wireless networks, in accordance with some embodiments.
Figure 5:
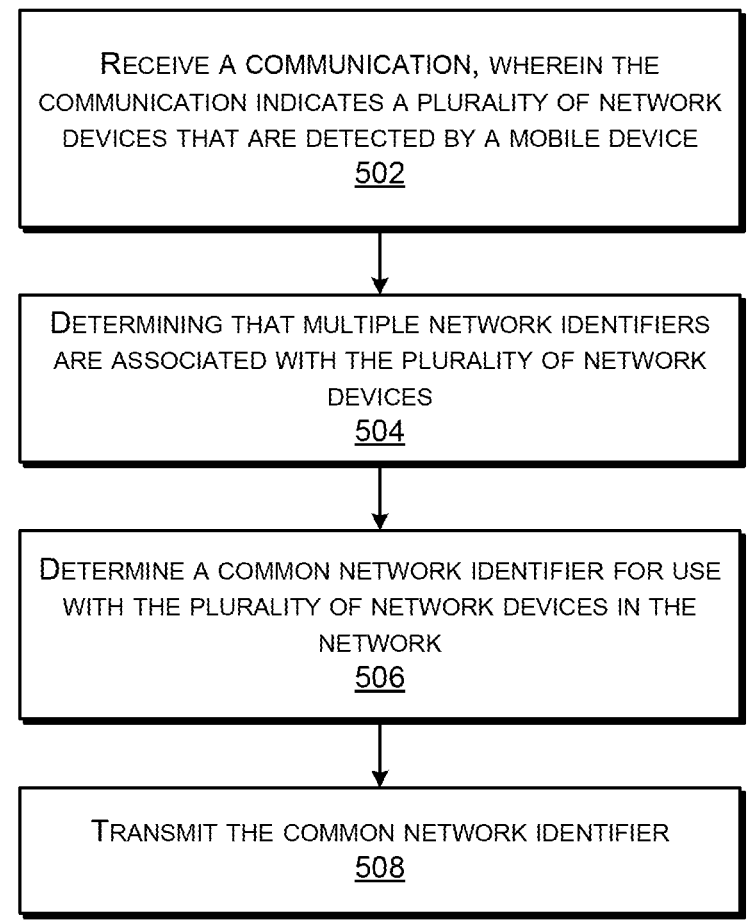
FIG. 5 is a flowchart illustrating an embodiment of another process for unifying multiple logical wireless networks, in accordance with some embodiments.

FIGS. 3-5 provide techniques for unifying multiple logical wireless networks that exist within a local area network. Unification of the logical networks allows a user to access all network devices within the local area network regardless of the gateway with which the network devices may be attached. For example, using the techniques described below, the server of the cloud network 114 may determine that multiple network IDs are associated with the wireless local area network 100, and thus that multiple logical networks exist. Upon determining that multiple logical networks exist, the server may determine a common network ID that can be used to unify the multiple logical networks.

FIG. 3 illustrates an embodiment of a process 300 for unifying multiple logical wireless networks. In some aspects, the process 300 may be performed by a computing device, such as a network device 102, 104, or 106 shown in FIG. 1. Process 300 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Process 300 may include utilizing intra-network device communications to inform a cloud network server of the existence of multiple network identifiers. At 302, the process 300 includes receiving, at a first network device in a network, a communication. The first network device is associated with a first network identifier and the communication includes a second network identifier associated with a second network device. The network may include a local area network (e.g., local area network 100). In some embodiments, the first network identifier is associated with a service set identification and a media access control address of a first gateway in the local area network, and the second network identifier is associated with a service set identification and a media access control address of a second gateway in the local area network. In some embodiments, the first network device and the second network device are associated with a home automation network, such as the local area network 100 described above with respect to FIG. 1.

As one example, the network device 102 may receive the communication from the network device 106. As previously described, the network device 102 is associated with the first network identifier and the network device 106 is associated with the second network identifier. In some embodiments, the communication may be received when the first network device is rebooted (e.g., powered on, reset or restored to default settings, or the like). For example, when the network device 102 is rebooted, it may broadcast one or more messages on the local area network 100 to discover whether there are any other network devices in the local area network 100. For example, the messages may be broadcast according to a UPnP protocol during a discovery process. The network device 102 may receive a response from the network device 106 indicating that it is located within the local area network 100. The network device 102 may then query network device 106 in order to receive the communication including the second network identifier. In some embodiments, the network device 106 may also query network device 102 in order to receive the first network identifier.

In some embodiments, the first network device may compare the first network identifier to the second network identifier, and may determine that there is a mismatch between the first network identifier and the second network identifier. For example, the network device 102 having the first network identifier may determine the mismatch based on the comparison with the second network identifier received from the network device 106. The network device 102 is aware that it belongs to the same local area network 100 as that of network device 106 because they are discoverable to each other when performing discovery. Accordingly, when the network device 102 detects the mismatch between the first and second network identifiers, it can determine that two virtual networks have been registered for the same local area network 100.

At 304, the process 300 includes transmitting an indication that multiple network identifiers are associated with the network. The multiple network identifiers include the first network identifier and the second network identifier. For example, network device 102 may transmit the indication to the server of the cloud network 114. In some embodiments, the transmitting may include transmitting an indication of the mismatch between the first identifier and the second identifier. For example, the network device 102 may send a communication to the server indicating that a mismatch exists between network identifiers of the network devices 102 and 106. In some embodiments, the network device 106 may also send a communication to the server indicating that it also determined that the mismatch in network identifiers exists. In some embodiments, the transmitting may include transmitting the first network identifier and the second network identifier to the sever (e.g., by one or both of the network devices). In such embodiments, the server may then determine that a mismatch exists between the first and second network identifiers and that multiple logical networks exist within the local area network.

At 306, the process 300 includes receiving a common network identifier. For example, once the server determines that multiple network identifiers exist within the local area network, the server may determine the common network identifier. The common network identifier can be registered to or associated with both of the gateways (e.g., gateways 110 and 112) that were registered as the first and second logical networks with the first and second network identifiers, respectively. Various techniques that may be used to determine the common network identifier are discussed below with respect to the process 400 illustrated in FIG. 4. The second network device may also receive the common network identifier. The common network identifier can be used by both the first network device and the second network device, resulting in the two logical networks with two different network identifiers being unified into a single logical network with the common identifier. A mobile device may then access both the first and second network devices either locally or remotely from the local area network. While remote from the local area network, all access requests from the mobile device will be routed through a cloud network (e.g., cloud network 114), which will be discussed below with respect to FIG. 4.

FIG. 4 illustrates another embodiment of a process 400 for unifying multiple logical wireless networks. In some aspects, the process 400 may be performed by a computing device, such as the server of the cloud network 114 discussed above with respect to in FIG. 1. Process 400 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Similar to process 300, the process 400 utilizes intra-network device communications to inform a cloud network server of the existence of multiple network identifiers. At 402, the process 400 includes receiving a communication, wherein the communication includes an indication that a first network identifier and a second network identifier are associated with a plurality of network devices in a network. The network may include a local area network (e.g., local area network 100). For example, the server of the cloud network 114 may receive the communication from the network device 102 and/or the network device 106. As previously described with respect to FIG. 3, the network device 102 and/or 106 may send a communication to the server indicating that a mismatch exists between network identifiers of the network devices 102 and 106. Alternatively, the network device 102 and/or 106 may send the first network identifier and the second network identifier to the sever, as previously described, and let the server determine that the mismatch exists. Based on the communication, the server may determine that a mismatch exists between the first and second network identifiers and that multiple logical networks exist within the local area network.

At 404, the process 400 includes determining a common network identifier for use with the plurality of network devices in the network. For example, the server may determine the common network identifier once it is determined that multiple network identifiers exist within the local area network.

Various techniques may be used to determine the common network identifier. In some embodiments, the server may designate a network identifier from among the currently existing network identifiers to be the common network identifier. As one example, determining the common network identifier may include terminating the second network identifier and designating the first network identifier as the common network identifier. For instance, the server may select the network identifier of the first logical network that was issued a network identifier by the server. In this instance, the server may choose the first network identifier issued for the first logical network associated with gateway 110 (as described above with respect to FIG. 2). The first network identifier may then become the common network identifier. As another example, determining the common network identifier may include randomly selecting the first network identifier or the second network identifier, and designating the randomly selected first network identifier or second network identifier as the common network identifier. For instance, the server may randomly select among the existing first or second network identifiers to choose a common network identifier. As yet another example, the process 400 may include obtaining a network identifier of a mobile device, and wherein determining the common network identifier may include designating the network identifier of the mobile device as the common network identifier. For instance, the server may select the network identifier of the logical network with which the mobile device has access. For example, the mobile device can be associated with one gateway at a time when located within the local area network. In this instance, the network identifier may include the network identifier of the gateway that the phone is connected to at the time it receives a network identifier and key from a network device. When being associated with the logical network, the server will associate the mobile device with that network identifier. For example, if the mobile device 108 was last associated with the logical network of gateway 110, for example, the server may select the first network identifier as the common network identifier.

Once any of the above techniques are used to determine a common network identifier, the server may consolidate the records of the first logical network (associated with the first network identifier) and the second logical network (associated with the second network identifier) in order to unify the two logical networks into a common logical network. As previously described, the server may store the first network identifier, the first set of security keys, the credentials of the gateway 110 (e.g., SSID and MAC address), and the network device 102 identifier (e.g., network device MAC address) in a first logical network record at a first memory space. The server may also store the second network identifier, the second set of security keys, the credentials of gateway 112, and the network device 106 identifier in a second logical network record at a second memory space. In the event the server selects the first network identifier to be the common network identifier, the server may consolidate the first and second records into a common record by transferring the information from the second memory space to the first memory space and removing any reference to the second network identifier. In other embodiments, the server may consolidate the first and second records by creating a bi-directional pointer between the first and second memory spaces. For example, the pointer may be located in the first memory space and may point a program to the second memory space once the program is done reading from the first memory space. By consolidating the records, all of the information that was previously associated with the second network identifier is now associated with the first network identifier, which is designated as the common network identifier. As a result, the first and second logical networks are unified into a single record.

Another technique for determining a common network identifier may include creating a new network identifier. For example, determining the common network identifier may include terminating the first network identifier and the second network identifier, determining a new network identifier, and designating the new network identifier as the common network identifier. The new network identifier may be generated sequentially or randomly, as previously described. A new record may then be created including the newly created common network identifier. The server may store the new record in a new memory space, and may transfer the information from the first and second memory spaces to the new memory space. Accordingly, the first and second set of security keys, the credentials of the gateways 110 and 112, and the identifiers of the network device 102 and 106 may be stored in the new record at the new memory space, resulting in the first and second logical networks being unified into a single record.

At 406, the process 400 includes transmitting the common network identifier to one or more of the plurality of network devices. In some embodiments, the server may transmit the common network identifier to the plurality of network devices in the network. For example, the server may transmit the common network identifier to the network devices 102, 104, and 106. The server may transmit the common network identifier to a network device after the network device sends the communication reporting the mismatch and/or the existence of the multiple network identifiers to the server. For example, after the network device 102 transmits the communication to the server and the server determines that the first network identifier is to be used as the common network identifier, the server may instruct the network device 102 to continue using the first network identifier. At a later point in time, the network device 106 may transmit a communication to the server reporting the mismatch in network identifiers and/or the existence of the multiple network identifiers. The server, having already determined the common network identifier, may then transmit the common network identifier to the network device 106 and may instruct the network device 106 to update its network identifier to the common network identifier. Accordingly, all network devices 102, 104, 106 within the local area network 100 may be instructed to use the same common network identifier regardless of the gateway 110 or 112 with which they are attached.

In some embodiments, the server may further transmit the common network identifier to all mobile devices associated with the local area network. In some embodiments, one or more of the network devices may transmit the common network identifier to the mobile devices. As a result, when a mobile device attempts to access any of the network devices while located remotely from the local area network, the mobile device will provide the common identifier to the server and a signature generated using the unique security key that the mobile device has stored. The server will determine that the common network identifier is associated with all network devices that are in the local area network based on the consolidated record. As described above, the server will generate a signature using the same technique as that used by the mobile device, and will determine whether the signatures match. Once authenticated, the mobile device 108 may have access to one or more of the network devices within the local area network.

FIG. 5 illustrates another embodiment of a process 500 for unifying multiple logical wireless networks. In some aspects, the process 500 may be performed by a computing device, such as the server of the cloud network 114 discussed above with respect to in FIG. 1. Process 500 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

The process 500 utilizes mobile device communications to inform a cloud network server of the existence of multiple network identifiers. At 502, the process 500 includes receiving a communication. The communication indicates a plurality of network devices that are detected by a mobile device, and the network devices detected by the mobile device are in a network. The network may include a local area network, such as local area network 100. In one example, the server within the cloud network 114 may receive, at a first point in time, a communication from the mobile device 108 that is located within the local area network 100. The communication may indicate that the mobile device 108 has discovered a particular number of network devices in the local area network 100. For example, during a discovery process (e.g., according to a UPnP protocol, or the like), the mobile device 108 may receive broadcasts from three network devices 102, 104, and 106. The broadcasts may be received in response to a discovery request sent from the mobile device 108. In some embodiments, the broadcasts from the network devices 102, 104, and 106 may include a media access control (MAC) address and/or serial number of the network devices 102, 104, and 106. In such embodiments, the communication from the mobile device to the server may include a MAC address of each of the plurality of network devices detected by the mobile device. In some embodiments, the communication may include a serial number of each of the plurality of network devices detected by the mobile device.

In some embodiments, while performing discovery, the mobile device 108 may detect various other devices on the network that are not of particular interest (e.g., all devices that support UPnP may respond to the discovery request from the mobile device 108). For example, an application or program running on the mobile device 108 may only be interested in home automation network devices. In such embodiments, the mobile device 108 may filter out all detected devices that are not home automation network devices, and may thus only keep a record of the home automation network devices. For example, each network device may identify itself as a particular type of device. The mobile device 108 may filter the devices that are not designated as the desired type.

At 504, the process 500 includes determining that multiple network identifiers are associated with the plurality of network devices. For example, the communication may include MAC addresses of the network devices 102, 104, and 106, indicating to the server that these three network devices were detected by the mobile device 108. The server may then go to the record of each network device 102, 104, 106 using the MAC addresses. The server may determine from the record for network device 102 and 104 that the first network identifier is associated with these network devices. The server may determine from the record for network device 106 that the second network identifier is associated with this network device. Accordingly, the server may determine that two logical networks exist within the local area network 100.

The remaining steps of process 500 may be similar to steps 404 and 406 described above with respect to FIG. 4. At 506, the process 500 includes determining a common network identifier for use with the plurality of network devices in the network. Similar to that discussed above with respect to FIG. 4, the server may use various techniques to determine a common network identifier. As one example, determining the common network identifier may include terminating a first network identifier associated with a first network device and designating a second network identifier associated with a second network device as the common network identifier. As another example, determining the common network identifier may include randomly selecting a network identifier from one or more network identifiers associated with the network devices and designating the randomly selected network identifier as the common network identifier. As yet another example, the process 500 may include obtaining a network identifier of a mobile device, and determining the common network identifier may include designating the network identifier of the mobile device as the common network identifier. As another example, determining the common network identifier may include terminating all network identifiers associated with the network devices, determining a new network identifier, and designating the new network identifier as the common network identifier.

Similar to that discussed above with respect to FIG. 4, once any of the above techniques are used to determine a common network identifier, the server may consolidate the records of the first logical network and the second logical network, or may generate a new record, in order to unify the two logical networks into a common logical network with the common network identifier.

At 508, the process 500 includes transmitting the common network identifier to the plurality of network devices. For example, the server may transmit the common network identifier to the network devices 102, 104, and 106. Accordingly, all network devices 102, 104, 106 within the local area network 100 may be instructed to use the same common network identifier regardless of the gateway 110 or 112 with which they are attached. In some embodiments, the server may further transmit the common network identifier to all mobile devices associated with the local area network. In some embodiments, one or more of the network devices may transmit the common network identifier to the mobile devices. The mobile devices may then be authenticated similarly to that discussed above with respect to FIG. 4. Once authenticated, the mobile device 108 may then have access to all network devices within the local area network.

Figure 6A:
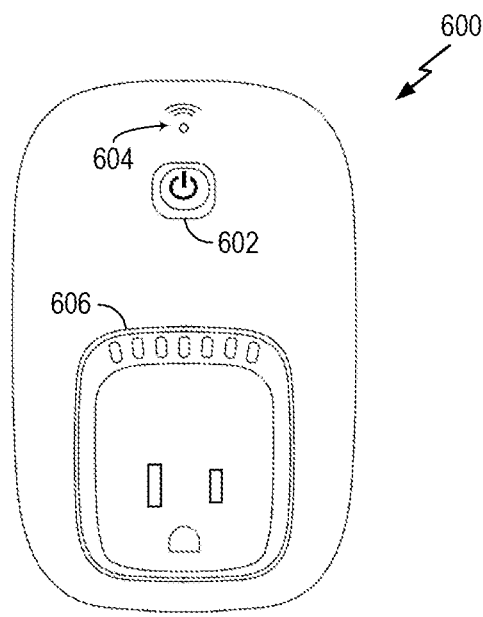
FIG. 6A is an illustration of an example of a front view of a network device in accordance with an embodiment.
Figure 6B:
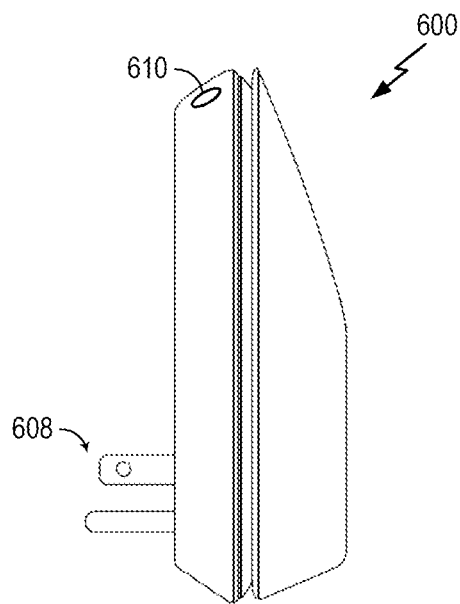
FIG. 6B is an illustration of an example of a side view of a network device in accordance with an embodiment.

FIG. 6A illustrates an example of a front view of a network device 600 and FIG. 6B illustrates an example of a side view of the network device 600. The network device may include any of the network devices 102, 104, or 106 described herein. In some embodiments, the network device 600 may be a home automation network device. For example, the network device 600 may include a home automation switch that may be coupled with a home appliance. A user may wirelessly access the network device 600 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 600 may include a WiFi enabled switch that connects home appliances and other electronic devices to a compatible 802.11b/g/n WiFi network. The network device 600 may thus allow users to locally or remotely turn devices on or off from anywhere, program customized notifications, and/or change device status. The network device 600 may further allow a user to create custom schedules or have devices respond to sunrise or sunset.

The network device 600 includes an power switch 602 that may be depressed in order to turn the network device 600 on and off. In some embodiments, a light source may be integrated with or located behind the power switch. For example, a light-emitting diode (LED) may be located on a circuit board under the power button 602. The light source may be illuminated when the network device 600 is powered on, and may not be illuminated when the network device 600 is powered off.

The network device 600 further includes a communications signal indicator 604. The signal indicator 604 may indicate whether the network device 600 has access to a communications signal, such as a WiFi signal. For example, the signal indicator 604 may include a light source (e.g., a LED) that illuminates when the network device 600 is connected to a communications signal. The light source may depict different colors or other characteristics (e.g., flashing, dimming, or the like) to indicate different levels of signal strength or mode of operation.

The network device 600 includes a restore button 610. The restore button 610 may allow a user to reset the network device 600 to factory default settings. For example, upon being depressed, the restore button 610 may cause all software on the device to be reset to the settings that the network device 600 included when purchased from the manufacturer.

The network device 600 further includes a plug 608 and an outlet 606. The plug 608 allows the network device 600 to be plugged into a wall socket, such as a socket providing 120V, 220V, or the like. In turn, an appliance may be plugged into the outlet 606. Once the network device 600 is registered according to the techniques described above, an appliance plugged into the socket 606 may be controlled by a user using a mobile device (e.g., mobile device 108).

Figure 7:
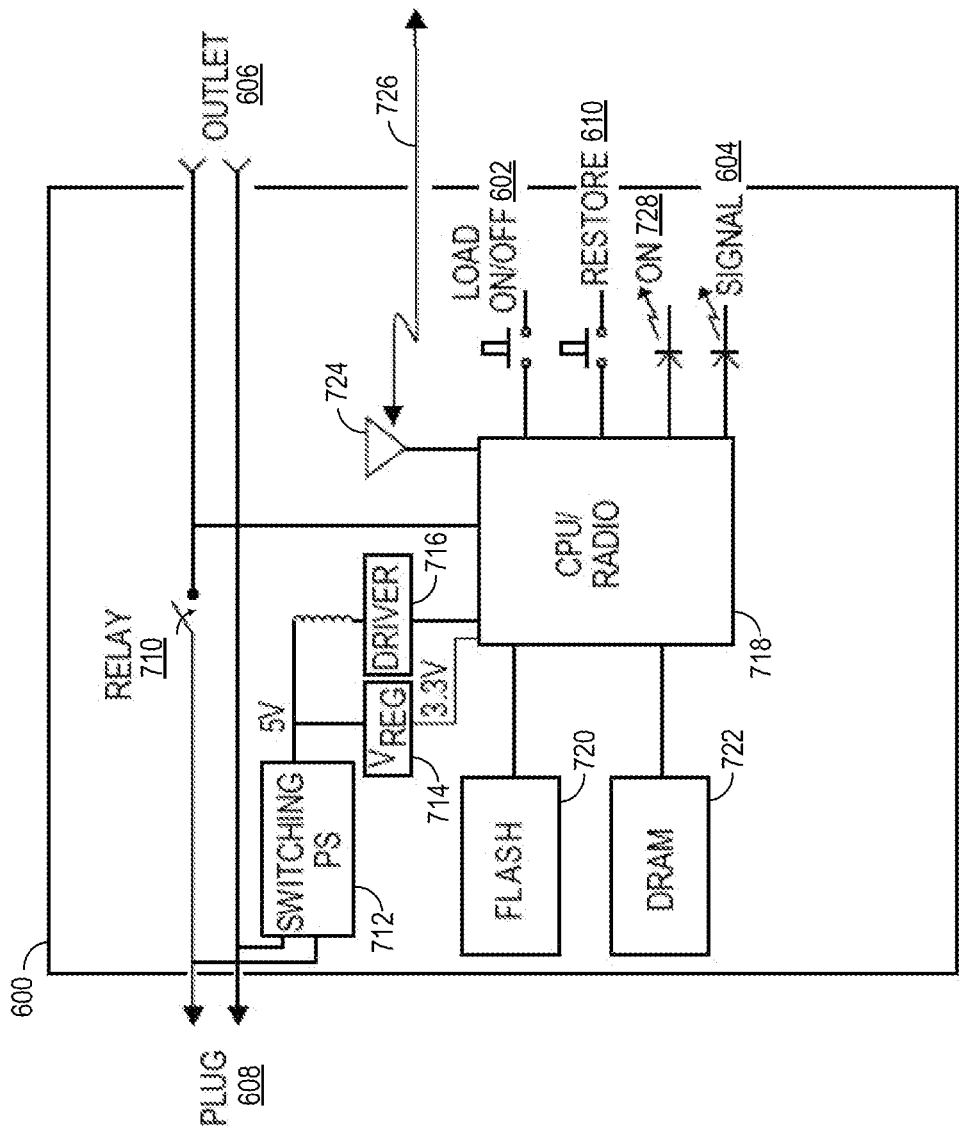
FIG. 7 is an example of a block diagram of a network device, in accordance with an embodiment.

FIG. 7 is an example of a block diagram of the network device 600 depicting different hardware and/or software components of the network device 600. As described above with respect to FIG. 6, the network device 600 includes the outlet 606, the plug 608, the power button 602, the restore button 610, and the communications signal indicator 604. The network device 600 also includes light source 728 associated with the power button 602. As previously described, the light source 728 may be illuminated when the network device 600 is powered on.

The network device 600 further includes a relay 710. The relay 710 is a switch that controls whether power is relayed from the plug 608 to the outlet 606. The relay 710 may be controlled either manually using the power button 602 or remotes using wireless communication signals. For example, when the power button 602 is in an ON position, the relay 710 may be closed so that power is relayed from the plug 608 to the outlet 606. When the power button 602 is in an OFF position, the relay 710 may be opened so that current is unable to flow from the plug 608 to the outlet 606. As another example, an application or program running on a mobile device may transmit a signal that causes the relay 710 to be opened or closed. For instance, a mobile application may display a graphical interface on the mobile device that includes a power button. The user may tap or otherwise select the power button, and the mobile application may send a communication signal (e.g., over a WiFi network) to the network device 600 instructing the network device 600 to open or close the relay 710.

The network device 600 further includes flash memory 720 and dynamic random access memory (DRAM) 722. The flash memory 720 may be used to store instructions or code relating to an operating system, one or more applications, and any firmware. The flash memory 720 may include nonvolatile memory so that any firmware or other program can be can updated. In the event the network device 600 loses power, information stored in the flash memory 720 may be retained. The DRAM 722 may store various other types of information needed to run the network device 600, such as all runtime instructions or code.

The network device 600 further includes a CPU/Radio 718. The CPU/Radio 718 controls the operations of the network device 600. For example, the CPU/Radio 718 may execute various applications or programs stored in the flash memory 720 and/or the dynamic random access memory (DRAM) 722. The CPU/Radio 718 may also receive input from the various hardware and software components, interpret the input, and perform one or more functions in response to the input. As one example, the CPU/Radio 718 may determine whether the power button 602 has been pressed, and determines whether the relay 710 needs to be opened or closed. The CPU/Radio 718 may further perform all communications functions in order to allow the network device 600 to communicate with other network devices, one or more gateways, a cloud network, and/or one or more mobile devices. The network device 600 may communicate with other devices and/or networks via antenna 724. For example, antenna 724 may include a 2.4 GHz antenna that can transmit and receive WiFi communications signals. The antenna 724 may include other types of antennas that can communicate Bluetooth® signals, Zigbee® signals, Ultra-Wideband (UWB) signals, and/or the like. In some embodiments, the network device 600 may include multiple antennas for communicating different types of communication signals.

The network device 600 further includes a driver 716, a switching power supply 712, and a voltage regulator 714. The driver 716 may include instructions or code that can be used to translate control signals or commands received from applications running on the DRAM 722 to commands that the various hardware components in the network device 600 can understand. In some embodiments, the driver 716 may include an ambient application running on the DRAM 722. The switching power supply 712 may be used to transfer power from the outlet in which the plug 608 is connected to the various loads of the network device 600 (e.g., CPU/Radio 718). The switching power supply 712 may efficiently convert the voltage and current characteristics of the electrical power to a level that is appropriate for the components of the network device 600. For example, the switching power supply 712 may perform AC-DC conversion. In some embodiments, the switching power supply 712 may be used to control the power that is relayed from the plug 608 to the outlet 606. The voltage regulator 714 may be used to convert the voltage output from the switching power supply 712 to a lower voltage usable by the CPU/Radio 718. For example, the voltage regulator 714 may regulate the DC voltage from 5V to 3.3V.

In various embodiments, functions may be stored as one or more instructions or code in memory, such as the flash memory 720 and/or the DRAM 722. The network device 600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 2-3, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2-3. The memory, such as the flash memory 720 and/or the DRAM 722, may be a processor-readable memory and/or a computer-readable memory that stores software code (programming code, instructions, etc.) configured to cause a processor(s) within the CPU/Radio 718 to perform the functions described. In other embodiments, one or more of the functions described may be performed in hardware.

A set of these instructions and/or code might be stored on a computer-readable storage medium, such as the flash memory 720 and/or the DRAM 722. In some cases, the storage medium might be incorporated within a computer system, such as the CPU/Radio 718. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 600 and/or might take the form of source and/or installable code, which, upon compilation and/or installation on the network device 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

It should be appreciated that the network device 600 may have other components than those depicted in FIGS. 6 and 7. Further, the embodiment shown in the figures are only one example of a network device that may incorporate an embodiment of the invention. In some other embodiments, network device 600 may have more or fewer components than shown in the figure, may combine two or more components, or may have a different configuration or arrangement of components.

Figure 8:
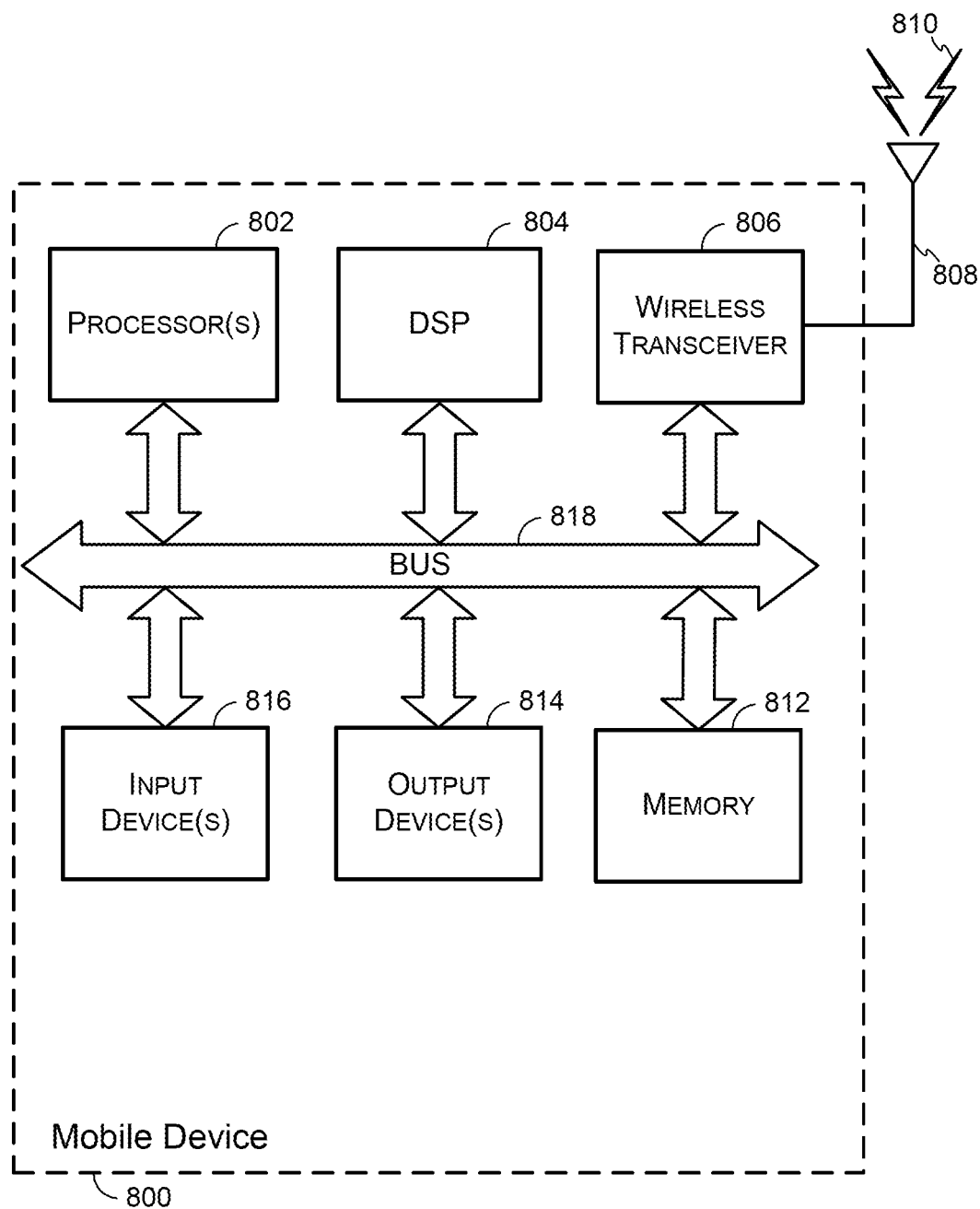
FIG. 8 is a block diagram illustrating an example of a mobile device, in accordance with some embodiments.

FIG. 8 illustrates an example of a mobile device 800. The mobile device 800 may be a cellular telephone, a smartphone, a laptop computer, a tablet, a personal digital assistant (PDA), a computing device, or any other mobile device having wireless connection capability. The mobile device 800 includes hardware elements that can be electrically coupled via a bus 818 (or may otherwise be in communication, as appropriate). In one embodiment, the bus 818 can be used for the processor(s) 802 to communicate between cores and/or with the memory 812. The hardware elements may include one or more processors 802, including without limitation one or more general-purpose processors and/or one or more special-purpose processors (such as digital signal processing chips, graphics acceleration processors, and/or the like); one or more input devices 816, which can include without limitation a camera, a mouse, a keyboard, a touch sensitive screen, a touch pad, a keypad, and/or the like; and one or more output devices 814, which can include, without limitation, a display, a printer, and/or the like.

The mobile device 800 may include one or more wireless transceivers 806 connected to the bus 818. The wireless transceiver 806 may be operable to receive a wireless signal 810 via antenna 808. The wireless signal 810 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 806 may be configured to receive various radio frequency (RF) signals 810 via antenna 808 from one or more gateways, network devices, cloud networks, and/or the like. Mobile device 800 may also be configured to decode and/or decrypt, via the DSP 804 and/or processor(s) 802, various signals received from one or more gateways, network devices, cloud networks, and/or the like.

The mobile device 800 may further include (and/or be in communication with) one or more non-transitory storage devices (e.g., memory 812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more instructions or code in memory 812, such as on a computer-readable storage medium, such as RAM, ROM, FLASH, or disc drive, and executed by processor(s) 802 or DSP 804. The mobile device 800 can also comprise software elements (e.g., located within the memory 812), including, for example, an operating system, device drivers, executable libraries, and/or other code, such as one or more application programs, which may comprise computer programs implementing various functions Memory 812 may be a processor-readable memory and/or a computer-readable memory that stores software code (programming code, instructions, etc.) configured to cause the processor(s) 802 and/or DSP 804 to perform the various functions. In other embodiments, the various functions described may be performed in hardware.

Figure 9:
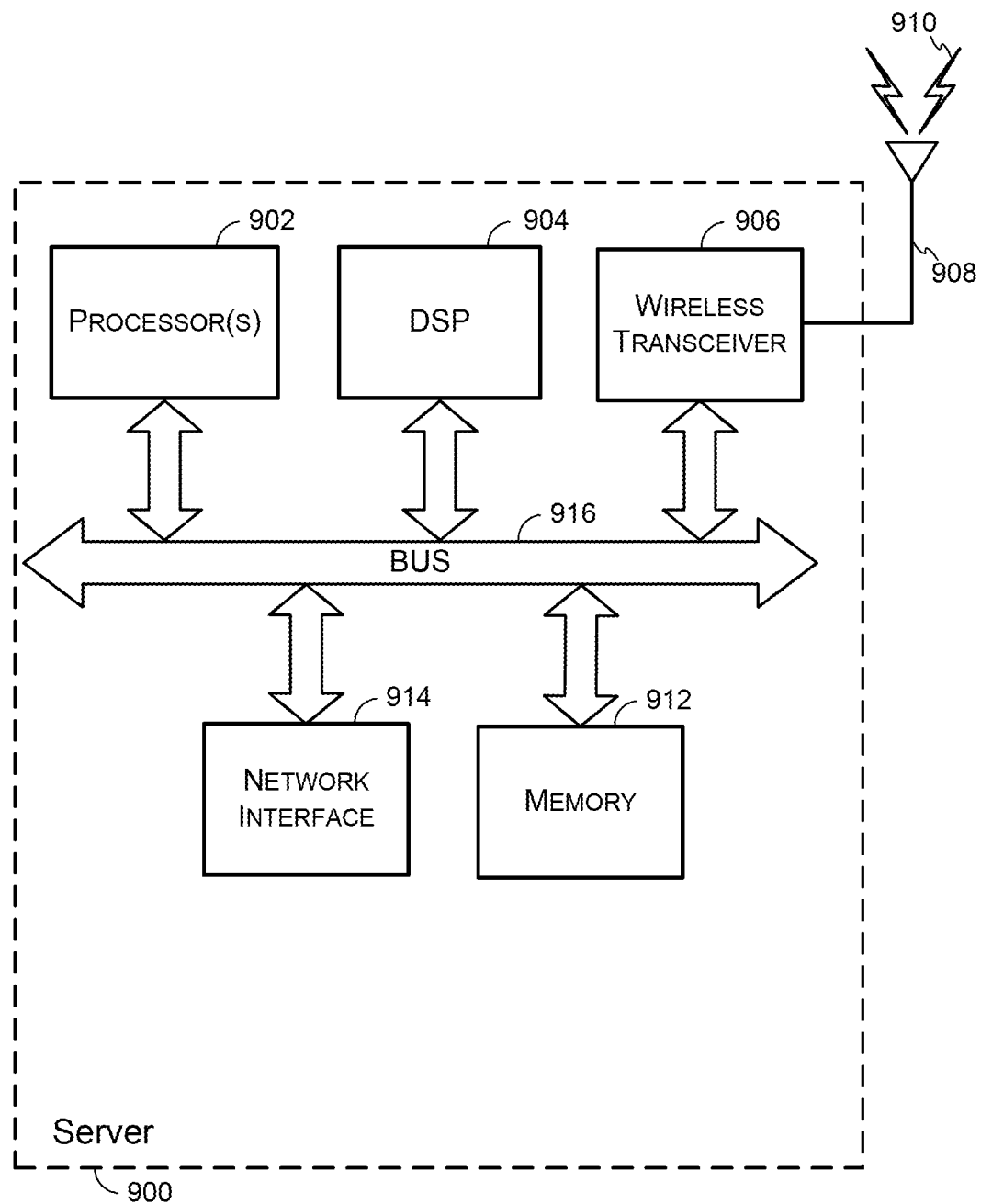
FIG. 9 is a block diagram illustrating an example of a server, in accordance with some embodiments.

FIG. 9 illustrates an example of a server 900. The server 900 includes hardware elements that can be electrically coupled via a bus 916 (or may otherwise be in communication, as appropriate). In one embodiment, the bus 916 can be used for the processor(s) 902 to communicate between cores and/or with the memory 912. The hardware elements may include one or more processors 902, including without limitation one or more general-purpose processors and/or one or more special-purpose processors (such as digital signal processing chips, graphics acceleration processors, and/or the like), memory 912, DSP 904, a wireless transceiver 906, a bus 916, and antenna 908. Furthermore, in addition to the wireless transceiver 906, server 900 can further include a network interface 914 to communicate with a network (e.g., a local area network, a network of a preferred carrier, Internet, etc.).

The server 900 may further include (and/or be in communication with) one or more non-transitory storage devices (e.g., memory 912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more instructions or code in memory 912. The server 900 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 4-5, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 4-5. The memory 912 may be a processor-readable memory and/or a computer-readable memory that stores software code (programming code, instructions, etc.) configured to cause the processor(s) 902 to perform the functions described. In other embodiments, one or more of the functions described may be performed in hardware.

A set of these instructions and/or code might be stored on a computer-readable storage medium, such as the memory 912. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the server 900 and/or might take the form of source and/or installable code, which, upon compilation and/or installation on the server 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
receiving, at a computing device, a communication, wherein the communication includes an indication that multiple network identifiers are associated with a plurality of network devices in a local area network, wherein the plurality of network devices are configured to access the local area network using one or more gateway devices of the local area network, and wherein access to the local area network is provided by multiple gateway devices;
determining multiple network identifiers are associated with the plurality of network devices, wherein the determination is made using the communication, wherein the multiple network identifiers are associated with the plurality of network devices due to access to the local area network being provided by the multiple gateway devices, wherein a gateway device is registered as a logical network and is assigned a network identifier for the logical network, wherein the logical network provides access to the local area network for network devices associated with the logical network, wherein a portion of the plurality of network devices are associated with the logical network and the network identifier, and wherein a mobile device is limited to connecting to network devices associated with one logical network at a time;
dynamically determining a common network identifier for use with the plurality of network devices in the local area network, wherein the common network identifier is dynamically determined when multiple network identifiers are determined to be associated with the plurality of network devices;
reassociating the multiple gateway devices and the plurality of network devices with the common network identifier, wherein the common network identifier facilitates connection of the mobile device with the plurality of network devices; and
transmitting the common network identifier to one or more of the plurality of network devices.

2. The method of claim 1, wherein determining the common network identifier includes:
terminating a first network identifier associated with a first network device; and
designating a second network identifier associated with a second network device as the common network identifier.

3. The method of claim 1, wherein determining the common network identifier includes:
terminating all network identifiers associated with the plurality of network devices;
determining a new network identifier; and
designating the new network identifier as the common network identifier.

4. The method of claim 1, wherein determining the common network identifier includes:
randomly selecting a network identifier from the multiple network identifiers associated with the plurality of network devices; and
designating the randomly selected network identifier as the common network identifier.

5. The method of claim 1, further comprising:
obtaining a network identifier of the mobile device; and
wherein determining the common network identifier includes designating the network identifier of the mobile device as the common network identifier.

6. The method of claim 1, wherein the communication includes an identifier of a network device and identifiers of network devices detected by the network device.

7. The method of claim 2, wherein the first network identifier is associated with a service set identification and a media access control address of a first gateway in the local area network, and wherein the second network identifier is associated with a service set identification and a media access control address of a second gateway in the local area network.

8. The method of claim 1, wherein the indication of the communication indicates a mismatch between a first network identifier and a second network identifier.

9. A computing device, comprising:
one or more processors; and
a non-transitory computer-readable storage medium containing instructions which when executed on the one or more processors, cause the one or more processors to perform operations including:
receiving a communication, wherein the communication includes an indication that multiple network identifiers are associated with a plurality of network devices in a local area network, wherein the plurality of network devices are configured to access the local area network using one or more gateway devices of the local area network, and wherein access to the local area network is provided by multiple gateway devices;
determining the multiple network identifiers are associated with the plurality of network devices, wherein the determination is made using the communication, wherein the multiple network identifiers are associated with the plurality of network devices due to access to the local area network being provided by the multiple gateway devices, wherein a gateway device is registered as a logical network and is assigned a network identifier for the logical network, wherein the logical network provides access to the local area network for network devices associated with the logical network, wherein a portion of the plurality of network devices are associated with the logical network and the network identifier, and wherein a mobile device is limited to connecting to network devices associated with one logical network at a time;
dynamically determining a common network identifier for use with the plurality of network devices in the local area network, wherein the common network identifier is dynamically determined when multiple network identifiers are determined to be associated with the plurality of network devices;
reassociating the multiple gateway devices and the plurality of network devices with the common network identifier, wherein the common network identifier facilitates connection of the mobile device with the plurality of network devices; and
transmitting the common network identifier to one or more of the plurality of network devices.

10. The computing device of claim 9, wherein determining the common network identifier includes:
   terminating a first network identifier associated with a first network device; and
   designating a second network identifier associated with a second network device as the common network identifier.

11. The computing device of claim 9, wherein determining the common network identifier includes:
   terminating all network identifiers associated with the plurality of network devices;
   determining a new network identifier; and
   designating the new network identifier as the common network identifier.

12. The computing device of claim 9, wherein determining the common network identifier includes:
   randomly selecting a network identifier from the multiple network identifiers associated with the plurality of network devices; and
   designating the randomly selected network identifier as the common network identifier.

13. The computing device of claim 9, further comprising instructions which when executed on the one or more data processors, cause the one or more processors to perform operations including:
   obtaining a network identifier of the mobile device; and
   wherein determining the common network identifier includes designating the network identifier of the mobile device as the common network identifier.

14. The computing device of claim 9, wherein the communication includes an identifier of a network device and identifiers of network devices detected by the network device.

15. The computing device of claim 9, wherein the first network identifier is associated with a service set identification and a media access control address of a first gateway in the local area network, and wherein the second network identifier is associated with a service set identification and a media access control address of a second gateway in the local area network.

16. The computing device of claim 9, wherein the indication of the communication indicates a mismatch between a first network identifier and a second network identifier.

17. A computer-program product tangibly embodied in a non-transitory machine-readable storage medium of a first network device, including instructions configured to cause one or more data processors to:
   receive a communication, wherein the communication includes an indication that multiple network identifiers are associated with a plurality of network devices in a local area network, wherein the plurality of network devices are configured to access the local area network using one or more gateway devices of the local area network, and wherein access to the local area network is provided by multiple gateway devices;
   determining multiple network identifiers are associated with the plurality of network devices, wherein the determination is made using the communication, wherein the multiple network identifiers are associated with the plurality of network devices due to access to the local area network being provided by the multiple gateway devices, wherein a gateway device is registered as a logical network and is assigned a network identifier for the logical network, wherein the logical network provides access to the local area network for network devices associated with the logical network, wherein a portion of the plurality of network devices are associated with the logical network and the network identifier, and wherein a mobile device is limited to connecting to network devices associated with one logical network at a time;
   dynamically determining a common network identifier for use with the plurality of network devices in the local area network, wherein the common network identifier is dynamically determined when multiple network identifiers are determined to be associated with the plurality of network devices;
   reassociating the multiple gateway devices and the plurality of network devices with the common network identifier, wherein the common network identifier facilitates connection of the mobile device with the plurality of network devices; and
   transmit the common network identifier to one or more of the plurality of network devices.

18. The computer-program product of claim 17, wherein determining the common network identifier includes:
   terminating a first network identifier associated with a first network device; and
   designating a second network identifier associated with a second network device as the common network identifier.

19. The computer-program product of claim 17, wherein determining the common network identifier includes:
   terminating all network identifiers associated with the plurality of network devices;
   determining a new network identifier; and
   designating the new network identifier as the common network identifier.

20. The computer-program product of claim 17, wherein determining the common network identifier includes:
   randomly selecting a network identifier from the multiple network identifiers associated with the plurality of network devices; and
   designating the randomly selected network identifier as the common network identifier.

* * * * *